June 30, 1953 — W. P. WILLETT — 2,643,664
FLOW DIVIDING VALVE
Filed Oct. 20, 1948

INVENTOR.
Warren P. Willett
BY M. C. Hayes
ATTORNEY

Patented June 30, 1953

2,643,664

UNITED STATES PATENT OFFICE 2,643,664

FLOW DIVIDING VALVE

Warren P. Willett, Westmoreland Hills, Md.

Application October 20, 1948, Serial No. 55,523

3 Claims. (Cl. 137—101)

(Granted under Title 35, U. S. Code (1952), sec. 266)

The invention relates to improvements in flow dividing valves particularly suitable for but not necessarily restricted to use in hydraulic systems for controlling the rate of flow of a liquid to a plurality of hydraulic motors where a uniform rate of piston motion or a constant speed ratio between a plurality of hydraulic motors is desired.

In an uncontrolled system of hydraulic motors it is obvious that the piston or pistons having the greatest resistance will be retarded while the one having the least resistance will be accelerated. An example of a practical application for the present flow dividing valve is aircraft landing gear where it is important that the two laterally opposed members of the landing gear be retracted or projected simultaneously. The valve is also adaptable for use in the production of artificial silk as a means for equalizing the flow of a spinning solution to a plurality of jets.

The primary object of the invention is to provide a flow dividing valve that will automatically control the rate of flow of a liquid in either direction between a main hydraulic conduit and a plurality of branch hydraulic conduits.

Another object of the invention is the provision of a flow dividing valve adapted to control the flow of a liquid between a main conduit and branch conduits in response to variations in the pressure differential between the branch conduits arising from changes in the velocity of flow therethrough.

Other objects and many of the attendant advantages of this invention will be readily appreciated as the same becomes better understood by reference to the following detailed description when considered in connection with the accompanying drawings wherein.

Figure 1:
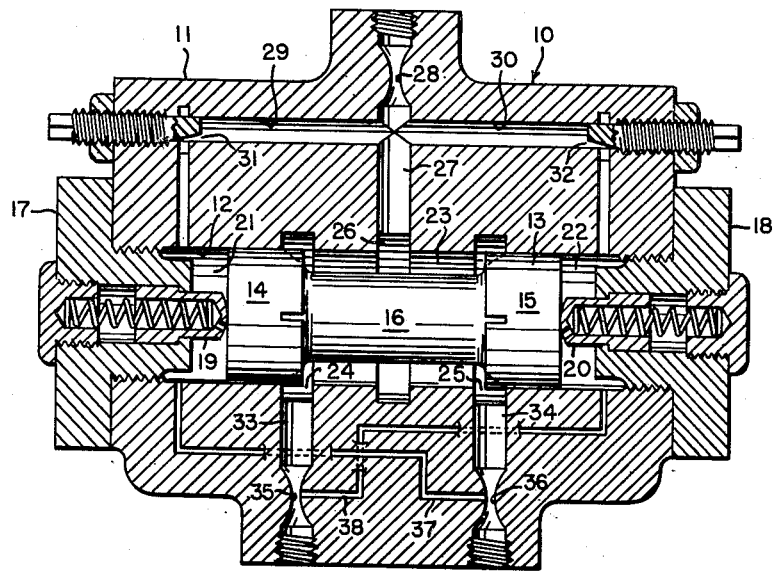
Fig. 1 is a central longitudinal sectional view of the improved flow dividing valve.

In the drawing, which for the purpose of illustration shows only a preferred embodiment of the invention, and wherein similar reference characters denote corresponding parts throughout the views, the numeral 10 generally designates the improved flow dividing valve which includes a housing 11 providing a cylindrical bore 12. Reciprocably slidable in the bore 12 is a spool valve 13 comprising spaced piston portions 14, 15 joined by a reduced central portion 16. Threaded in the ends of the housing 11 are plugs 17, 18 carrying spring-pressed contactors 19, 20 urging the spool valve 13 toward a central position where it is normally maintained. The bore 12 comprises opposite end spaces 21, 22 and an intermediate space 23 provided with a pair of spaced annular ports 24, 25 and a central annular port 26. Communicating with the central port 26 is a main hydraulic duct 27 provided with a flow restricting Venturi section 28, the purpose of which will be hereinafter described. Extending between a zone in the main duct inwardly of the Venturi section 28 and the opposite end spaces 21, 22 are passageways 29, 30 including adjustable orifices 31, 32. Communicating with the spaced ports 24, 25 are two branch hydraulic ducts 33, 34 provided with flow restricting Venturi sections 35, 36. The end space 21 is in communication with the branch duct 34 through a passage 37 which connects to the throat of the venturi 36. In a similar manner, the end space 22 is in communication with the branch duct 33 through a passage 38 which connects to the throat of the venturi 35.

Figure 2:
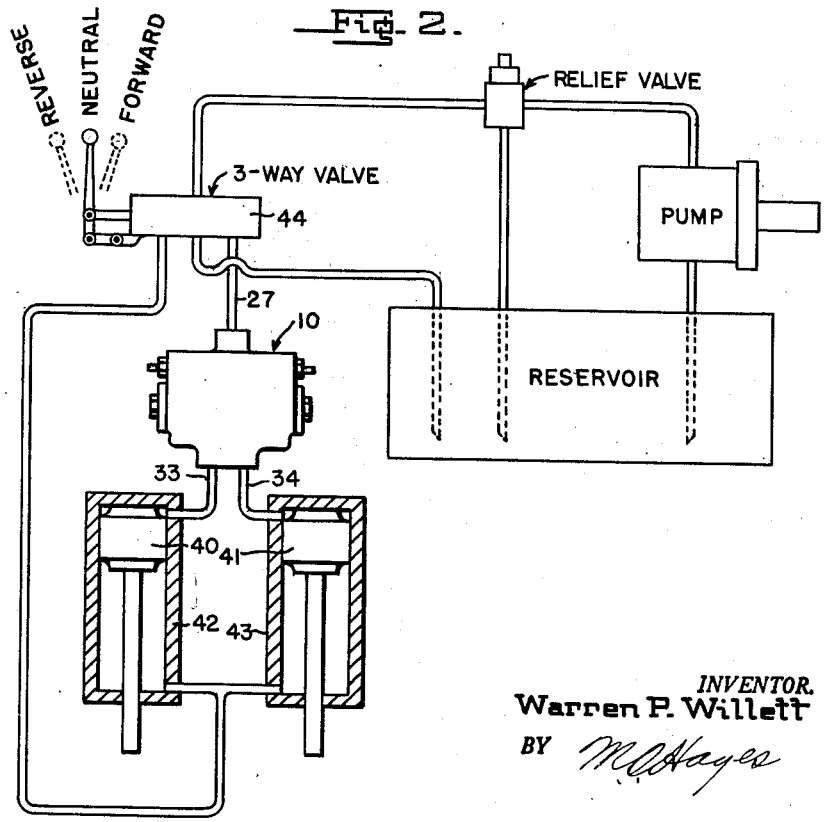
Fig. 2 is a diagrammatic view of a hydraulic system wherein the flow dividing valve is used to maintain a selected ratio of piston movement in either direction.

In Fig. 2 is diagrammatically shown a hydraulic system in which one of these flow dividing valves 10 is used to maintain a uniform ratio of motion of the pistons 40, 41 in cylinders 42, 43, the direction of motion of the pistons being controlled by a three-way valve 44.

In operation, the spool valve 13 will normally remain in the neutral position as long as the resistance and flow in the branch ducts 33, 34 are equal. Now if it is assumed that the resistance of the hydraulic motor connected to branch duct 33 increases, the velocity of flow will tend to decrease in duct 33 and increase in duct 34. This will result in a pressure differential between the venturis 35, 36 and consequently between the end chambers 21, 22 thus urging the spool valve toward the left where it will restrict flow in duct 34 and permit increased flow in duct 33. The valve spool will tend to move to the left until a state of equilibrium is reached between the two branch ducts.

Venturi 28 has no function when flow is in such a direction that the branch ducts 33, 34 serve as outlets for the valve. The object of the venturi 28 is to maintain a slight back pressure within the valve housing when flow is in the reverse direction, thus making it possible to establish a pressure differential between the static chambers 21, 22 so that the spool valve 13 will serve to control return flow in a manner similar to that in which it controls forward flow.

The operation of the device for reverse flow is as follows: Hydraulic pressure is supplied by the pump to the three way valve which is appropriately set to provide fluid communication between the pump and the bottom of cylinders 42, 43. The pistons 40, 41 are caused to move in an upward direction thus displacing the oil above said pistons through conduits 33, 34 into valve body 10, from which it flows to the reservoir which is at atmospheric pressure, as is common in systems of this character. In normal operation, the oil flows through passageways 33, 34, around central portions 16 of valve spool 13, through passageway 27 and venturi 28. The function of venturi 28 is to restrict the flow of fluid from the valve 10 and thereby impose a back pressure in the passages of the valve body so as to achieve proper operation of the valve. Restrictions 31 and 32 are adjusted so as to allow a predetermined amount of oil to flow to end spaces 21 and 22, and thereby exert a pressure against pistons 14 and 15 of valve spool 13, so as to normally retain same in a balanced condition. The oil flowing through venturis 35 and 36 creates a suction effect through lines 37 and 38 on that in the end spaces and it is apparent that there is a continual flow from said end spaces because of the venturi action. In the event that one of the lines, say 33, is clogged or the flow therethrough otherwise diminished, the resultant decrease will be such that a lesser amount is drawn by the venturi from end space 22, thus resulting in an increase in pressure in said space caused by the back pressure in the valve body. This increase in pressure is transmitted to piston 15 and causes the valve spool to move to the left, thereby providing for a greater flow through line 33 and decreasing that through line 34, so as to achieve simultaneous movement of pistons 40 and 41. The valve therefore reaches a point of equilibrium and tends to stay in this state until variation of flow through the supply conduits again interrupts the balanced condition, whereupon the valve spool will be caused to move until the new point of equilibrium is reached. It is, of course, obvious that other types of restricting means may be substituted for venturi 28.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalities thereon or therefor.

I claim:

1. In a flow proportioning device, a housing defining a chamber including opposite end zones and an intermediate zone, a main hydraulic duct communicating with said intermediate zone, two branch hydraulic ducts having spaced ports communicating with said intermediate zone, each of said spaced ports being adjacent one only of said end zones, valve means including two spaced connected members in said intermediate zone and movable toward a given one of said end zones to respectively increase and decrease the effective areas of said spaced ports adjacent and remote from said given end zone, spring biasing means urging said valve means to a central balanced position, said branch ducts each including a flow restricting Venturi portion, two passageways each respectively extending from one of said end zones to the flow restricting section of that branch duct whose port is remotely spaced from said one end zone, said main duct having a flow restricting Venturi portion for producing a back pressure within the housing when said main duct is serving as a hydraulic outlet for the housing, and two passageways each respectively extending from one of said end zones to said Venturi portion of said main duct.

2. In a flow proportioning device, a housing defining a chamber including opposite end zones and an intermediate zone, a main hydraulic duct communicating with said intermediate zone, two branch hydraulic ducts having spaced ports communicating with said intermediate zone, each of said spaced ports being adjacent one only of said end zones, valve means including two spaced connected members in said intermediate zone and movable toward a given one of said end zones to respectively increase and decrease the effective areas of said spaced ports adjacent and remote from said given end zone, said branch ducts each including a flow restricting Venturi portion, two passageways each respectively extending from one of said end zones to the flow restricting section of that branch duct whose port is remotely spaced from said one end zone, said main duct having a flow restricting Venturi portion for producing a back pressure within the housing when said main duct is serving as a hydraulic outlet for the housing, two passageways each respectively extending from one of said end zones to said Venturi portion of said main duct, and means for adjusting the resistance to hydraulic flow in at least one of said passageways.

3. In a flow proportioning device, a housing defining a cylindrical chamber including opposite end zones and an intermediate zone, a main hydraulic duct communicating with said intermediate zone, two branch hydraulic ducts having spaced ports communicating with said intermediate zone, each of said spaced ports being adjacent one only of said end zones, a spool valve including two spaced piston members in said intermediate zone and movable toward a given one of said end zones to respectively increase and decrease the effective areas of said spaced ports adjacent and remote from said given end zone, said branch ducts each including a Venturi portion, two passageways each respectively extending from one of said end zones to the Venturi section of that branch duct whose port is remotely spaced from said one end zone, said main duct having a Venturi portion for producing a back pressure within the housing when said main duct is serving as a hydraulic outlet for the housing, two passageways each respectively extending from one of said end zones to said Venturi portion of said main duct; and means constructed and arranged in cooperating relationship with said two passageways for adjusting the rate of response of said device to said flow in proportioning said flow.

WARREN P. WILLETT.

References Cited in the file of this patent

UNITED STATES PATENTS

| Number | Name | Date |
|---|---|---|
| 2,466,485 | Schultz | Apr. 5, 1949 |